(No Model.) 2 Sheets—Sheet 1.
J. E. SHERMAN.
CHAIN MAKING MACHINE.
No. 353,087. Patented Nov. 23, 1886.
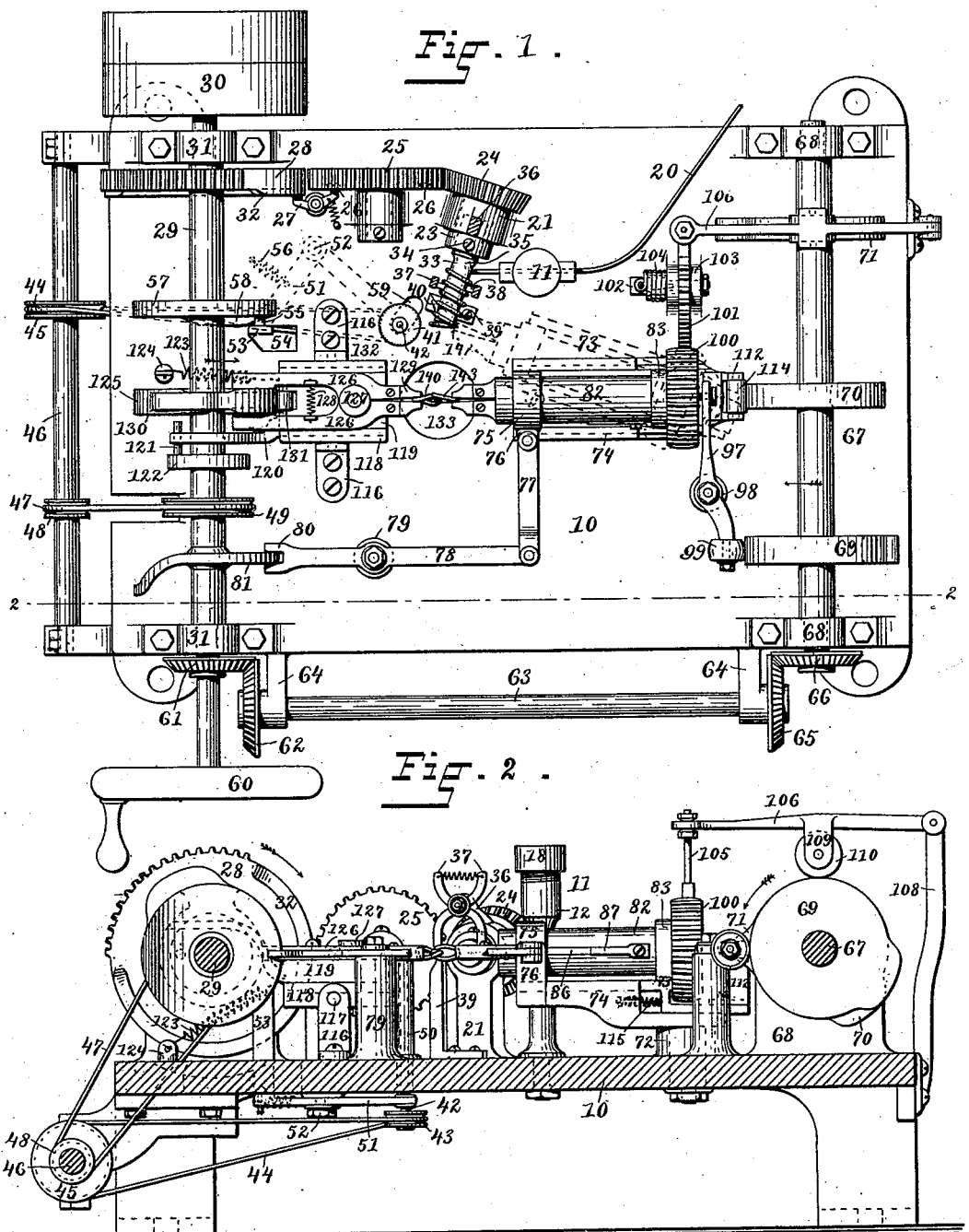
WITNESSES:
Chas. H. Luther Jr.
Willis Fowler
INVENTOR:
John E. Sherman
By Joseph A. Miller & Co.
Attys (No Model.) 2 Sheets—Sheet 2.

J. E. SHERMAN.
CHAIN MAKING MACHINE.

No. 353,087. Patented Nov. 23, 1886.

WITNESSES:
Chas. H. Luther Jr.
Willis Fowler.

INVENTOR:
John E. Sherman
by Joseph A. Miller & Co
Attys

N. PETERS, Photo-Lithographer, Washington, D. C.

UNITED STATES PATENT OFFICE.

JOHN E. SHERMAN, OF NORTH ATTLEBOROUGH, ASSIGNOR TO ENGLEY, WETHERELL & CO., OF CHARTLEY, MASSACHUSETTS.

CHAIN-MAKING MACHINE.

SPECIFICATION forming part of Letters Patent No. 353,087, dated November 23, 1886.

Application filed February 16, 1886. Serial No. 192,073. (No model.)

*To all whom it may concern:*

Be it known that I, JOHN E. SHERMAN, of North Attleborough, in the county of Bristol and State of Massachusetts, have invented certain new and useful Improvements in Link and Chain Making Machines, of which the following is a full, clear, and exact description, reference being had to the accompanying drawings, forming part of this specification.
My invention relates to link and chain making machines in which the link is formed from the metallic rod or wire which is fed into the machine as a continuous straight rod or wire.

The object of my invention is to provide a machine of this class whereby the links are formed from the straight rod fed to the machine, and subsequently the links are joined up and made into a continuous chain.

To this purpose my invention consists in the various combinations and sub-combinations of the several parts of the machine, as hereinafter fully described and claimed.

Figure 3:
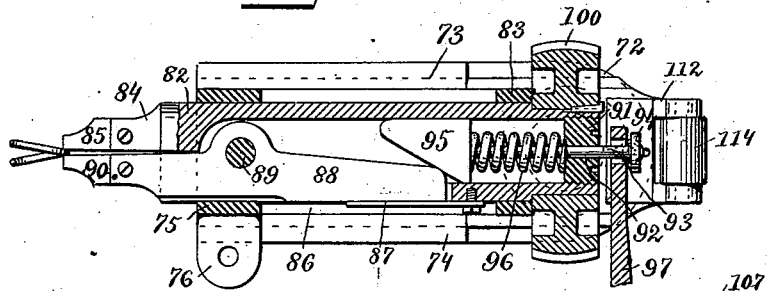
Figure 4:
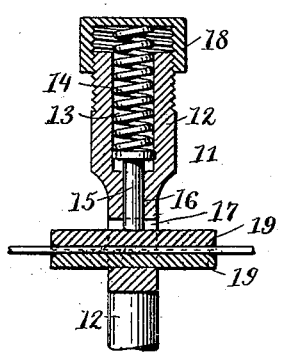
Figure 5:
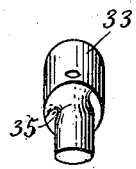
Figure 6:
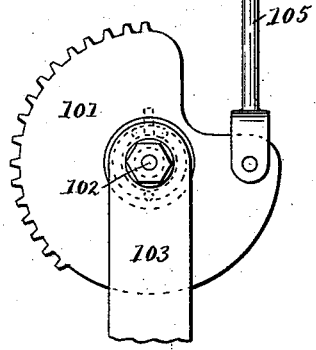
Figure 7:
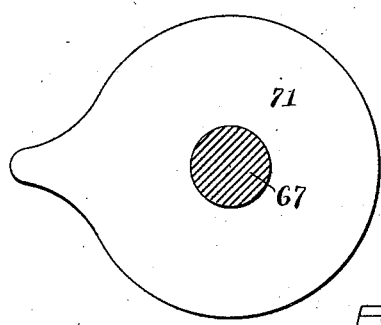
Figure 8:
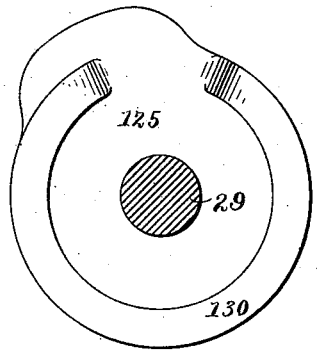
Figure 9:
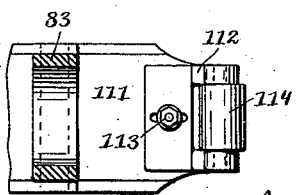

In the accompanying drawings, Figure 1 represents a top plan view of my improved machine with the wire for making the links and chain therein. Fig. 2 represents a sectional view of Fig. 1 on line 2 2. Fig. 3 represents a detached and enlarged view on a horizontal section of the so called "twist-grip" with a portion of the arm which controls the grip-and-slip motion of said twist-grip. Fig. 4 represents a detached and enlarged view of the spring-acted guide-clamp on a vertical plane parallel to the length of the wire passing therethrough. Fig. 5 represents an enlarged top perspective of the twist-arbor. Fig. 6 represents the cam 101 mounted in its bearings. (Shown enlarged and in part, and with a portion of its connecting-rods.) Fig. 7 represents an enlarged side view of the cam 71, showing its peculiar shape. Fig. 8 represents an enlarged side view of the cam 125, showing its peculiar shape and its ridge 130. Fig. 9 represents an enlarged top view of the standard 112, showing its connec-nection with the arm 111, shown in part.

In the said drawings like numbers designate like parts throughout.

Referring to the drawings, the platform 10 is flat and rectangular in shape, and is mounted upon ordinary supports or legs. The wire-guide clamp 11 consists of a vertical post, 12, bolted to the platform near its center, and has in the upper end the channels 13 and 16, which let into the side of the transverse socket-eye 17, in which rests the two-part clamp 19, which is composed of two similar parts of a semi-cylindrical shape with a straight longitudinal groove on the flat face for the reception of the wire 20, which slides therethrough in the operation of the machine. The presser 15 is a round bolt-shaped piece whose shank and head take into the channels 16 and 13, respectively, and its lower end rests upon the upper half of the clamp 19, while upon its flat head rests the spiral spring 14, which nests in the channel 13, and projects out of the top of said channel where the screw-cap 18 works in an external screw-thread on the end of post 12, and is arranged to compress and release the spring, as desired, when the tension of the clamp 19 is to be regulated. This guide-clamp serves to straighten the wire passing through it and free it from kinks, but its tension is never great enough to uncoil the wire from the arbor.

Near post 12 is fixed the upright 21, which carries in a large transverse eye the loose collar 23, turned by the bevel-gear 24, which meshes with the intermediate gear 25, suitably mounted upon a post and having two depressions, 26, on one face and diametrically opposite, in which takes the spring-acted pawl 27, suitably mounted adjacent thereto. The other end of pawl 27 rubs against the face of the cam 28, which is mounted upon the pulley-shaft 29, which has the fast and loose pulleys 30, and is set in the bearings 31 and runs across one end of the platform 10. The cam 28 turns in the direction of the arrow, and has about one-third of its periphery armed with gear-teeth and the remainder smooth.

On the inner face of cam 28 is a raised rim, 32, which dies away where the teeth begin, and against this rim presses the end of pawl 27, whereby it is kept in engagement with the depressions on gear 25, and is released therefrom when the gap in the rim 32 is being passed over, when the teeth on cam 28 mesh with the teeth on pinion 25, which is released by the pawl 27 and revolves, carrying the bevel-gear 24 with it.

The twist-arbor 33 is set by a screw, 34, into the collar 23, which is turned by bevel-gear 24. This twist-arbor is cylindrical in the part or stock which sets in the collar 23, and has a shank-piece which is oval or elliptical in cross-section, and which is twisted on its long axis at point 35 through an arc of about sixty degrees or forty-five degrees. The wire 20 is fed onto this twisted part of the arbor and then passes spirally around the arbor to its free end. If the arbor 33 were perfectly straight without a twist in it the straight wire 20 would be under tension when wound about the arbor, and would tend to spring back into a straight position, and would thereby produce a very irregular spiral coil around the arbor. By virtue of the spiral twist 35, which is a small channel-like depression on the two broad sides of the arbor-shank, the wire 20, when it is passed around said twist, is sprained and set into the proper curve to pass on and be wound about the straight part of the arbor and form thereabout a regular spiral, having little or no tendency to spring back into a straight form.

Upon the upper part of post 21, which carries the bevel-gear 24, is a fixed arm, 36, which overhangs the twist-arbor 33, and carries at its end a pair of spring-acted jaws, 37, which are provided on the inside with teeth 38, which press against the opposite sides of the arbor 33 and slightly out of alignment relative to the long axis of the shank, in order to keep the coils of the wire about the arbor properly spaced. Just below the end of arbor 33 lies a post, 39, which has at the upper end a guard-finger, 40, which presses against the side-of the arbor and also the part of the wire where it is to be cut by the cutter 41.

The rotary cutter 41 is borne by a spindle, 42, which passes down through platform 10, where it carries a pulley, 43, around which passes the belt 44 from the pulley 45, which is fixed upon the shaft 46, itself rotated by being belted to shaft 29 by means of belt 47, and the pulleys 48 and 49 borne by their respective shafts 46 and 29. The spindle 42 is incased by an upright sleeve, 50, above the upper end of which the rotary cutter 41 is located and turns upon its spindle 42. This spindle 42 is loosely mounted in the angle of the L-shaped arm 51, at a point between platform 10 and the pulley 43. The arm 51 rocks upon the pin 52, secured upon the under side of the platform 10, and has its other end provided with an upright, 53, which extends upwardly through the opening 54 in the platform, and carries the stud 55. The spring 56 tends to keep the rocker-arm 51 in the position shown, and the said arm is actuated by the cam 57, which has the raised portion 58 thereon, whereby the same operates the stud 55 to move the upright 53 across the opening 54, when the cam 57 revolves on its shaft 29 in the direction of the arrow. The upright 53 in moving across the opening 54 rocks the rocker-arm 51, which thereby moves the spindle 42 with its cutter 41 along the slot 59, cut in the platform 10. This motion carries the cutter 41 against the wire coiled upon the end of the twist-arbor 33, which is thereby severed, and the cutter is then prevented from cutting the next coil by the office of the guard 40, which acts as a protector to said wire.

Just before or during the severing of the wire on the end of the twist-arbor which is to form a link, the so-called "twist-grip," which has previously shifted its position into that of the dotted lines, grapples the said coil of wire, and when the same is severed the twist-grip returns to its former position bearing the piece of wire, which is now in the shape of an open link whose sides are not yet pressed into the same plane. The operations and construction of this twist-grip are hereinafter explained.

On one end of the shaft 29 is keyed the hand-wheel 60, which is turned to give the machine the initial motion. Between this wheel and the bearing 31 is fixed the bevel-gear 61, which meshes with a similar gear, 62, borne by the shaft 63, which is mounted in the arms 64, located upon the side of platform 10. Upon the other end of shaft 63 is fixed the bevel-gear 65, which takes into a similar gear, 66, mounted upon the end of the shaft 67, which is disposed in the bearings 68, correspondingly to shaft 29 across the end of the platform 10.

The shaft 67, with the cams 69, 70, and 71 mounted fixedly thereon, turns in the direction of the arrow, and its motion is derived from shaft 29 indirectly by means of the shaft 63 and the bevel-gears 61, 62, 65, and 66.

At the center of one side of the platform 10 is the boss 72, bolted to the platform, and upon it is swiveled the twist-grip, which is rotary thereon through the arc it travels in in doing its work.

The so-called "twist-grip" is composed of the carriage 74, which rests upon and is swiveled to the boss 72, with the main part of it extending to one side of the boss in toward the center of the platform 10, where on the upper side of the end it has the arm 76, to which is hinged by a bolt the arm or connecting-rod 77, which in turn is loosely hinged to the lever 78, fulcrumed on the post 79, and with its other end forked at 80, which spans the rim of the cam 81, which is peculiarly shaped with a bent-up portion of the rim, as shown, and which is fixedly mounted on the shaft 29. By this construction the cam 81 in its every revolution drives the twist-grip over into the position of the broken lines and returns it again. The slide 73 is sunk down in the upper face of the carriage, reciprocating thereon in direction of its length, and has the collars 75 and 83 disposed one at each end, and in these collars is mounted the barrel 82, which is adapted to turn on its long axis, but not to move endwise therein. This barrel 82 is hollowed out, and has a projection, 84, in front to one side, into which is set the jaw 85. In the side of the barrel is the longitudinal slot 86, which is open at the free end of said barrel and closed at the other, where is fixed the spring-finger 87, which works into said slot nearly throughout the length of the same. In the slotted side of the barrel 82 is fixed the lever-arm 88, pivoted on pin 89 and having the jaw 90. This arm 88 is quite flat, and is of the shape shown in Fig. 3, and has its inner portion working through the slot 86, when the spring-finger 87 presses upon it and tends to keep its jaw 90 open relatively to the jaw 85, which is fixed. In one end of the barrel 82 is set the screw-plug 91, having the central channel, 92, through which works the rod 93, having on its outer end the cap 94 and on the inner end the head 95, which is shaped as shown in Fig. 3. About the rod 93, and between the head 95 and plug 91, is situated the spiral spring 96, which has its ends bearing against the head and plug, respectively, and tends normally to keep the head 95 to its inward limit of travel, as shown in Fig. 3, and pressing against the spring-acted lever-arm 88, thereby keeping its jaw 90 closed against jaw 85. The head 95 is retracted and its spring 96 compressed by means of the lever 97, one end of which is fastened onto the rod 93 within the cap 94. This lever 97 is pivoted on the top of the post 98, and has its free end armed with an anti-friction roll, 99, which rubs against the periphery of cam 69, which rocks it so as to reciprocate the rod 93 to work the jaw 90 in making it grip and slip its hold.

On the other end from the jaws is keyed the cog-wheel 100, designed to turn the said barrel on its long axis by means of the partly-toothed cam 101, Fig. 6, which is mounted on the axle 102, which is set in the bearing 103, and which has the spiral spring 104 placed about it and fastened thereto by one of its free ends, while the other free end of the spring 104 is fastened to the bearing 103, so that when the cam 101 is depressed on the side of the connecting-rod 105, which acts to depress the same, the spring 104 is made tense, and its reaction tends to throw the cam back into normal position.

The cam 101 is operated by the rotation of the shaft 67 indirectly by means of the connecting-rod 105, which is loosely jointed thereto, and which is joined up with the rocker-arm 106, which is secured to the head of rod 105 by means of a pair of nuts, 107. This rocker-arm 106 has its other end pivoted to an upright, 108, fixed at the end of the platform 10, and has at about the center of its length a pair of depending lugs, 109, which carry the anti-friction roll 110, which bears against the periphery of the cam 71, whereby the roll is raised and lowered, which rocks the rocker-arm 106, and operates the cam 101 accordingly, and thereby turns the cog-wheel 100. From the lower face of the slide 73 runs the L-shaped arm 111, which passes under the cog-wheel 100 and out beyond the wheel, where upon the end is mounted the standard 112, whose foot slides on the arm 111, and can be adjusted properly by the set-screw 113, which is fixed into the arm 111 and passes through a slot in the foot of standard 112. (See Fig. 9.) At the upper end the standard 112 bears the anti-friction roll 114, which is kept in contact with the rim of the cam 70 by means of the spring 115 lying beneath slide 73, and exerting its force in direction of the length of same and toward said cam, so that when the cam revolves and pushes forward the roll 114 the slide 111 is thereby pushed forward, and carries with it the slide 73 with the barrel 82 and the other parts mounted thereon. This advance of the slide 111, by the action of cam 70, is made against the force of spring 115, which restores the slide and superposed barrel to their normal positions after the cam has advanced them.

On the opposite side of the platform 10, and correspondingly located, are the pair of vertical posts 116, which support the axle 117 turning thereon. Upon this axle 117 is mounted the tilting table 118, which tilts on the axle and carries the slide 119, sunk down in its face and sliding thereon. From the outer end and to one side of the slide 119 runs the curved arm 120, which is tripped by the stud 121, fixed upon the wheel 122, which turns with its shaft 29. This stud acts to throw the arm 120 up, and thereby tilts the slide 119 and table 118, so as to lower their inner ends. The spiral spring 123 is fixed by its lower end to the stud 124 on platform 10, and at the upper end to the corner of the slide 119, corresponding to the point from which arm 120 arises. This spring 123 serves to draw the slide 119 and the table 118 back into normal position after they have been pushed forward by the cam 125 and tilted by the arm 120, as hereinafter described.

Upon the upper face of the slide 119 is mounted the pair of lever-arms 126, which are pivoted on the rivet 127 and joined with the spring 128, which tends to keep open their inner ends, which are armed with the jaws 129, and their outer ends shut. The outer ends of the pair of arms 126 embrace the cam 125 on each side near the rim, around which, on each face, runs the ridge 130, which extends similarly on each face around about seven-eighths of the circumference of the cam. (See Fig. 8.) The revolution of this cam 125 serves to open and close the outer ends of the arms 126, whereby their jaws 129 are closed and opened. The periphery of the cam 125 rubs against the anti-friction roll 131, fixed on the outer edge of the slide 119, and in revolving the cam advances the slide 119 in the direction of the center of the platform 10, and consequently the arms 126, with their jaws 129, are advanced accordingly, and the spring 123, being thereby strained, serves to draw back the parts into their normal position.

The several parts 118, 119, 126, 127, 128, 129, and 131, I term the "clamp-grip" 132.

The operation of the machine is as follows: The straight wire 20, coming from a reel, (not shown,) is by hand wound about the arbor 33, and the hand-wheel 60 is turned till the said wire is wound spirally around the twist-arbor 33, as shown, the wire being fed through the guide-clamp 11 under proper tension, and going onto the twist-arbor 33, about the channel-like depression 35, is thereby sprained and set so as to prevent the uncoiling of the wire from said arbor. The machine is then started and run by the power-pulley 30, whereby the shafts 29, 63, and 67 are all rotated, as described. The twist-arbor 33 is rotated by means of its gears 24 25 and cam 28, whereby an intermittent motion is given it every time it gives off a link from its end. The cutter 41 travels toward the arbor 33 by means of its gearing, and the twist-grip also moves over into the broken-line position by means of the connections 77 78 and cam 81. While the twist-grip is being moved over to the broken-line position the jaw 90 is opened by virtue of the operation of the arm 97, being acted on by its cam 69 and withdrawing the head 95. When the twist-grip is in position of the broken lines and the jaw 90 is opened, the cam 70 advances the twist-grip onto the coil of wire upon the end of the twist-arbor 33, and the jaw 90 is closed to grip said coil, which is now being severed by the cutter 41, which in the meantime has advanced into cutting position. The coil or the link 140 is then held in the jaws 90 85 of the twist-grip, which returns into normal position. The clamp-grip 132 then advances, and its jaws 129 being opened by the operations of the cam 125, they close on the link 140, and clamp and press it into a flat closed link. When the link 140 is thus pressed into a flat link by the clamp-grip, the twist-grip, which still has hold of the other end of said link, is turned on its axis slightly by means of the cog-wheel 100, the cam 101, and its connections with the cam 71. This slight turn of the twist-grip gives a curved or twisted form to the link, which is then released by the twist-grip, which returns to the twist-arbor 33 for link 143, as described, while the clamp-grip 132 returns into normal position to await the return of the twist-grip with its newly-acquired link, 143, when it advances, and the two links 140 and 143 are held in the position shown in Fig. 1. The clamp-grip 132 then, by means of its tilting motion, before described, places the closed twisted link 140 upon one end of the open link 143. Then it releases link 140, and, rising, advances and clamps and presses link 143 into a closed flat link, which is subsequently twisted and released by the twist-grip, which will then return to the twist-arbor 33 for another newly-formed open link, and so on the process is repeated, forming a continuous and complete chain.

The opening 133, just beneath the jaws of the twist-grip and the clamp-grip, is designed for the links or chain to fall through as it is made and removed from beneath the platform 10.

There may be various modifications made in the several parts of my machine without an essential departure from the spirit of my invention herein described and claimed. For instance, the machine may be arranged and adjusted to make links and not join them up into a chain; or the the twist-grip may be constructed so as not to twist the links, whereby a flat chain would be formed instead of one of the curb or twist form.

Having thus described my invention, I claim as new and desire to secure by Letters Patent—

1. In combination, a two-part clamp, said parts placed flatly together and each provided with a corresponding groove on their meeting faces, said grooves registering to form a guideway, a support provided with a socket for said clamp, a spring-acted presser engaging one of said parts, and a tension device engaging said presser, whereby a wire set in said guideway may receive a constant spring-pressure.

2. In combination, a support provided with a transverse socket, a two-part clamp set through said socket and consisting of two similar semi-cylindrical members, each having a rectilinear groove on the flat face in the central line of length, said grooves registering to form a guideway, a longitudinal channel in said support and communicating with said socket, a presser working in said channel and engaging with one end one of said clamp members, a spring nested in said channel and engaging the other end of said presser, and a binding screw-cap working on the screw-threaded free end of said support and engaging the free end of said spring, whereby the adjustment of the cap may regulate the pressure of the clamp members on each other.

3. In combination, a twist-arbor consisting of a stock provided with a flat and rounded shank having channel-like depressions on the broad sides near said stock, a support provided with a transverse perforation and a rotary collar set therein, and means for intermittently rotating said collar, said stock fixed rigidly in said collar and rotated thereby.

4. In combination, a twist-arbor consisting of a cylindrical stock provided at one end with a shank elliptical in cross-section and extending in the line of the long axis of said stock, a spiral channel-like depression on each flat side of said shank near its juncture with said stock, an upright provided with a transverse socket-eye, a rotary collar set in said eye and provided at one end with a bevel-gear, an idle gear-wheel in mesh with said bevel-gear and provided with a spring-acted check device, a cam keyed on the power-shaft and provided with a partially-toothed periphery in mesh with said idle-gear, a partial circumferential rim upon a face of said cam and engaging with said check device, and means for actuating said power-shaft, whereby said gears may intermittently rotate said twist-arbor.

5. In combination, the twist-arbor constructed and mounted substantially as described, an idle-gear-wheel in mesh with the bevel-gear controlling said arbor, one face of said wheel provided with two diametrically-opposite depressions, a suitably-mounted spring-acted pawl having one end bearing constantly on said face in the path of said depressions when said wheel is rotated, a power-shaft and actuating means therefor, a cam keyed on said shaft and having a portion of the periphery thereof provided with cog-teeth and the remainder smooth, and a raised rim extending circumferentially and partially around one face of said cam and coincident with said smooth periphery, the other end of said pawl continuously engaging said rim and lack of rim, whereby said gears may rotate said bevel-gear, and so the twist-arbor, at intervals.

6. In combination, the twist-arbor, substantially as described, a support provided with a transverse socket-eye, a rotary collar set loosely in said eye, said twist-arbor rigidly mounted in said collar, an arm adjacent to said support and overhanging said twist-arbor, and a pair of spring-acted jaws attached to said arm, each arm provided with a corresponding tooth, said pair of teeth engaging the opposite sides of the shank of said twist-arbor and out of alignment relative to the axis of the arbor, whereby said teeth may take between adjacent coils of a spiral wire passed about said arbor.

7. In combination, the twist-arbor, substantially as described, a support provided with a transverse socket-eye and a rotary collar loosely set therein, said arbor mounted rigidly in said collar, a rigid arm set on said support and overhanging the shank of said twist-arbor a pair of jaws pivoted near their centers upon the free end of said arm, a spring connecting corresponding ends of said jaws, the other end of said jaws provided each with a tooth, said jaws arranged with the teeth engaging opposite sides of said shank and on a line diagonal to the long axis of said shank, and means for intermittently rotating said twist-arbor, whereby said teeth may take between adjacent coils of a wire passed spirally about said shank and moving on its length thereabout.

8. In combination, the twist-arbor constructed and mounted substantially as described, means for intermittently rotating said arbor, a rotary cutter, suitably mounted and traveling at intervals toward and away from said arbor and cutting on or near the shank of said arbor, means for revolving said cutter, and means for moving said cutter to and from said arbor.

9. In combination, the twist-arbor constructed and mounted substantially as described, means for intermittently rotating said arbor, a rotary cutter mounted on a spindle and disposed with its axis of rotation normal to the long axis of said arbor, a guard-finger arranged adjacent to a side of said shank for the cutter to cut on, said spindle loosely mounted on an L-shaped rocker arm, suitably pivoted at the angle thereof, a normal fixed arm on said rocker-arm and provided with a stud, a power-shaft and actuating means therefor, a cam keyed on said shaft and provided with a circumferentially-disposed raised portion, said stud constantly engaging the face of said cam having said raised portion, and in the path thereof, said spindle provided at the end remote from the cutter with a fixed pulley, and another fixed pulley on a rotary shaft adjacent to said power-shaft and belted to said first pulley, whereby said spindle may rotate the cutter and the rocker-arm may carry said cutter toward and away from the shank of the arbor at intervals.

10. In combination, a swiveled carriage suitably mounted, means for reciprocating said carriage on its swivel through a predetermined arc, and a body or barrel superposed on said carriage and provided with a pair of jaws adapted to open and close, whereby said jaws may be carried to and fro over said arc.

11. In combination, a swiveled carriage suitably mounted, means for moving said carriage on its bearing to and fro in a predetermined arc, a body superposed on said carriage and provided with a pair of jaws capable of opening and closing, and means for working said jaws, whereby said jaws may be swung back and forth in said arc and the jaws worked at intervals.

12. In combination, a swiveled carriage and support therefor, means for reciprocating said carriage on its bearing in a predetermined arc, a body superposed on said carriage and turnable on its long axis, means for turning said body, a fixed and a movable spring-acted jaw working together on said body, and means for opening and closing said movable jaw or its fellow, whereby said jaws may travel to and fro in said arc and may open and close and turn on their axis, which lies parallel to the plane of the mouth formed by said jaws.

13. In combination, a pivoted or swiveled carriage and a support therefor, means for reciprocating said carriage in a definite arc, a slide mounted on said carriage, and means for reciprocating said slide, a body or barrel set on said slide and turnable on its long axis, but not in itself movable on the length of said axis, means for turning said body on said axis, a fixed and a movable spring-acted jaw placed and working together in said barrel, and actuating means for said movable jaw, whereby said jaws may oscillate in said arc and work and turn on themselves and advance and recede on radii of said arc.

14. In combination, a carriage swiveled near one end to a suitable support, an arm projecting from near the other end of said carriage, a lever pivoted upon a stand and provided with a connecting-rod, having one end thereof pivoted to the free end of said arm, a power-shaft and actuating means therefor, a cam keyed on said shaft and provided with an edge partially upset, said edge or periphery working in a fork on the other end of said lever, a body superposed on said carriage and provided with jaws adapted to open and close, and means for working said jaws, said lever and cam adjusted to control and reciprocate said carriage in a certain arc, whereby said jaws may move over said arc and work on themselves.

15. In combination, a carriage swiveled near one end to a suitable support and means for reciprocating said carriage on its swivel in a definite arc, a hollow cylindrical barrel superposed on said carriage, a fixed jaw extending from the end of said barrel remote from the swivel of said carriage, an arm lying in said barrel and fulcrumed on a pivot fixed in the barrel and provided at the outer end with a jaw coacting with said fixed jaw, a spring fixed upon the outside of said barrel and engaging the inner end of said arm through a slot in the barrel, a perforated screw-plug set in the end of said barrel remote from said jaws, a rod working through said eye and provided at the outer end with a cap and at the inner end with a head engaging and sliding over the inner end of said arm, a coil-spring surrounding said rod between its head and said plug, a lever fulcrumed near its center on a fixed post and having one end thereof loosely secured to the outer end of said rod, a rotary shaft and means for actuating the same, and a circular-shaped cam keyed on said shaft and provided with a radial projection on the periphery, the periphery of said cam engaging constantly the other end of said lever, whereby the jaws may traverse the arc and open and close at intervals.

16. In combination, a swiveled carriage and support therefor, means for reciprocating said carriage on its swivel through a definite arc, a body or barrel superposed upon said carriage and adapted to turn on its long axis in its bearings, a pair of jaws adapted to open and close set upon the end of said body remote from the swivel of said carriage, a cogwheel keyed upon the other end of said body, a cam provided with peripheral cogs constantly in mesh with said cog-wheel, said cam keyed on an axle journaled in a stand and provided with a spring normally unstrained and acting to restore said cam always to normal position, a rotary shaft and actuating means therefor, a disk-shaped cam keyed on said shaft and provided with a radial extension on the periphery, a rigid arm adjacent to said shaft and having a lever pivoted to the free end, said lever constantly engaged near its center by the periphery of said cam, and an arm pivoted upon the other end of said lever and secured to the said spring-acted toothed cam by a knuckle-joint, said toothed cam adjusted whereby the jaws may travel over the arc and be turned in accordance with the cam adjustment on the axis lying parallel to the plane of the mouth formed by said jaws.

17. In combination, a swiveled carriage and a support therefor, means for reciprocating said carriage on its swivel through a determined arc, a slide provided with ways on said carriage and reciprocating thereon at right angles to said swivel-joint, an upright collar fixed near each end of said slide, a body or barrel set in said collars with the line of length parallel to the line of reciprocation of said slide, said body turnable in said collars, but not movable endwise therein, and provided with a pair of grappling-jaws at the end thereof remote from the swivel of said carriage, an L-shaped arm rigidly secured by one member thereof to the end of said slide and adjacent to the swivel of said carriage, a standard adjustably mounted by its foot on the other end of said arm and provided with a roller at the head thereof, a rotary shaft and actuating means therefor, and a circular-shaped cam keyed on said shaft and provided with a radial projection on the periphery thereof, the periphery of said cam engaging the roller on said standard, whereby the slide may be reciprocated on the carriage in the radii of said arc.

18. In combination, a tilting table and a support therefor, a pair of spring-acted jaws superposed on said table, means for tilting the table, and means for opening and closing the jaws.

19. In combination, a tilting table and a support therefor, means for tilting said table at intervals, a slide provided with guides upon said table and reciprocating thereon, means for reciprocating said slide, a pair of spring-acted jaws pivoted upon said slide and capable of opening and closing on each other, and means for working said jaws, whereby said table may be tilted and the slide reciprocated and the jaws worked at intervals.

20. In combination, a table rigidly mounted on an axle journaled in fixed supports, a power-shaft adjacent to said table and actuating means for said shaft, a wheel keyed on said shaft and provided with a trip-stud projecting from one face, a rigid arm controlling the tilting of said table and disposed in the path of said trip-stud, a pair of pivoted coacting jaws superposed on said table, and a retracting-spring controlling said table to keep it in normal position, whereby the jaws may be moved out and in a plane normal to the plane of the mouth formed by said jaws at intervals.

21. In combination, a tilting table provided with guides and a slide reciprocating thereon in a line always parallel with the plane of the table, a retracting-spring secured to said slide and to an adjacent fixed point, a roller upon one end of said slide, a power-shaft having a cam keyed thereon, said cam consisting of a circular disk having a radial projection on the periphery and engaging the roller on said slide, a pair of spring-acted jaws pivoted on said slide, and means for tilting said table, whereby the jaws may be oscillated in a plane normal to the plane of the table and reciprocated on their line of length at intervals.

22. In combination, a tilting table suitably pivoted in fixed supports, a slide reciprocating on guides formed on said table and in a plane parallel to the plane of said table and parallel to the axial line of the pivoted bearings of said table, a spring attached between one end of said slide and to a fixed adjacent point, a pair of lever-arms pivoted at corresponding points to the same pivot on said slide, said arms provided with jaws at one end, forming a mouth lying in a plane normal to the plane of reciprocation, the other end of said lever-arms connected by a spring, a power-shaft and actuating means therefor, a cam keyed on said shaft and consisting of a disk having a radial projection on the periphery, and each face provided with a correspondingly situated raised ridge disposed circumferentially and partially around said disk, the ends of said lever-arms remote from the jaws engaging each with one of said ridges and lack of ridge, said radial projection of the cam engaging a roller upon the adjacent end of said slide, and means for tilting said table, whereby said jaws may sweep through an arc lying in a plane normal to the plane of reciprocation and may advance and recede on the line of reciprocation, and may open and close at intervals.

23. In combination, the wire-guide clamp, the twist-arbor actuated at intervals, the reciprocating rotary cutter adjacent to said arbor, and means for actuating said arbor and said cutter, said parts assembled and arranged on the platform, all substantially as described.

24. In combination, the clamp-grip and the twist-grip arranged oppositely on the platform, and constructed and operated substantially as described.

25. In combination, the wire-guide clamp, the twist-arbor, the reciprocating rotary cutter, the clamp-grip, and the twist-grip, all assembled on the platform and arranged, constructed, and operated substantially as described.

26. In combination, the post 12, fixed upon platform 10, the socket-eye 17 and the communicating channels 13 and 16, the two-part clamp 19, set in eye 16, the presser 15, working in channels 13 and 16, the spring 14, engaging said presser, and the screw-cap 18, working on a screw-thread on post 12, substantially as described.

27. In combination, the twist-arbor 33, having the spiral twist 35 on the shank thereof, the upright 21, provided with a transverse perforation, and the collar 23, journaled in said perforation, substantially as described.

28. In combination, the upright 21, provided with a transverse perforation, the collar 23, provided with the screw 34 and set in said perforation, the twist-arbor 33, having the twist 35 thereon, the arm 36, provided with the spring-acted jaws 37, the bevel-gear 24, fixed to collar 23, the idle-gear 25, provided with depressions 26 in a side thereof and mounted on a post, the power-shaft 29, provided with the cam 28, having cog-teeth on part of the periphery, and having the raised rim 32, the spring-acted pawl 27, mounted on a fixed post and engaging the cam 28 and gear 25 with its respective ends, and the platform 10, substantially as described.

29. In combination, the rocker-arm 51, pivoted on pin 52 on platform 10, the spring 56, the spindle 42, journaled in arm 51 and provided with a sleeve, 50, the cutter 41, fixed to said spindle, the fixed pulley 43, communicating with pulley 45 on shaft 46 by means of belt 44, the pulley 48 and pulley 49, provided with belt 47, the opening 54 in platform 10, the fixed arm 53, provided with a stud, 55, the cam 57, provided with the raised rim 58, and the guard-finger 40, substantially as described.

30. In combination, the tilting table 118, provided with a fixed axle, 117, journaled in the posts 116, the slide 119, reciprocating on said table and provided with the arm 120, the spring 123 and the roll 131, the lever-arms 126, provided with jaws 129 and spring 128, and pivoted on pivot 127, and the cam 125, keyed on shaft 29 and provided with the ridges 130, substantially as described.

31. In combination, the carriage 74, swiveled on the boss 72, the slide 73, provided with the collars 75 and 83, the barrel 82, set in said collars and provided with a projection, 84, having a jaw, 85, the lever-arm 88, pivoted on pin 89 and provided with jaw 90, the spring 87, working through a slot, 86, the screw-plug 91, having a channel, 92, therein, the rod 93, provided with head 95 and cap 94 and the spring 96, the lever 97, pivoted on post 98 and provided with roller 99, the rotary shaft 67, indirectly operated by shaft 29, and the cam 69, all substantially as described.

32. In combination, the carriage 74, swiveled on the boss 72, the arm 76, fixed to said carriage, the connecting-rod 77, the lever 78, fulcrumed by a pivot on post 79 and provided with a forked end, 80, the power-shaft 29, and the cam 81, keyed on said shaft and engaging said fork, substantially as described.

33. In combination, the slide 73, provided with an arm, 111, the adjustable standard 112, mounted on said arm and provided with the roll 114, the cam 70, keyed on shaft 67, the bevel-gear 66 on shaft 67, the shaft 63, provided with bevel-gears 65 62 and journaled in brackets 64 on platform 10, and the power-shaft 29, provided with gear 61, substantially as described.

34. In combination, the rotary barrel 82, provided with the cog-wheel 100, the toothed cam 101, mounted on axle 102, the bearing 103 and spring 104, the connecting-rod 105, the lever 106, provided with hanger 109 and roll 110, and the upright 108, fixed upon platform 10, substantially as described.

JOHN E. SHERMAN.

Witnesses:
J. A. MILLER, Jr.,
M. F. BLIGH.